US011391396B2

(12) United States Patent
Ohnemus

(10) Patent No.: US 11,391,396 B2
(45) Date of Patent: *Jul. 19, 2022

(54) ADJUSTABLE RISER SUPPORT ASSEMBLY

(71) Applicant: ASC Engineered Solutions, LLC, Exeter, NH (US)

(72) Inventor: Gregory Nicholas Stagliano Ohnemus, Providence, RI (US)

(73) Assignee: ASC Engineered Solutions, LLC, Exeter, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,796

(22) Filed: Jan. 6, 2021

(65) Prior Publication Data

US 2021/0123547 A1   Apr. 29, 2021

Related U.S. Application Data

(63) Continuation of application No. 16/194,164, filed on Nov. 16, 2018, now Pat. No. 10,914,407.

(51) Int. Cl.
*F16L 3/00* (2006.01)
*F16L 3/18* (2006.01)
*F16L 19/02* (2006.01)

(52) U.S. Cl.
CPC ............ *F16L 3/18* (2013.01); *F16L 19/0206* (2013.01); *F16L 19/0218* (2013.01)

(58) Field of Classification Search
CPC ....... F16L 3/18; F16L 3/26; F16L 3/00; F16L 19/0218; F16L 19/0206
USPC .............................. 248/49, 65, 70, 73; 285/24
See application file for complete search history.

(56) References Cited

U.S. PATENT DOCUMENTS

| 6,324,800 | B1 * | 12/2001 | Valentz | E04G 5/00 |
| | | | | 52/298 |
| 6,592,093 | B2 * | 7/2003 | Valentz | F16L 3/18 |
| | | | | 248/677 |
| 8,931,763 | B2 * | 1/2015 | Tharp | F16L 21/06 |
| | | | | 261/122.1 |
| 9,194,516 | B2 | 11/2015 | Beagen, Jr. | |
| 9,625,164 | B2 * | 4/2017 | Vargas | F24F 13/02 |
| 9,642,477 | B2 * | 5/2017 | Kontschak | F16M 11/22 |
| 9,822,907 | B1 * | 11/2017 | Hennon | F16L 3/223 |
| 10,206,500 | B2 * | 2/2019 | Schiavello | F16L 3/015 |
| 10,914,407 | B2 * | 2/2021 | Ohnemus | F16L 21/065 |

(Continued)

OTHER PUBLICATIONS

Ohnemus, Gregory Nicholas Stagliano; Non-Final Office Action for U.S. Appl. No. 16/194,164, filed Nov. 16, 2018, dated Sep. 22, 2020, 11 pgs.

(Continued)

*Primary Examiner* — Todd M Epps
(74) *Attorney, Agent, or Firm* — Taylor English Duma LLP

(57) ABSTRACT

Example aspects of riser support assembly and a riser system are disclosed. The riser support assembly can comprise a riser support pipe comprising a cylindrical sidewall defining a first end, an opposing second end, and an intermediate portion extending therebetween; and a mount defining an arm and a pedestal, the arm extending from the intermediate portion of the cylindrical sidewall, the pedestal extending from the arm distal to the riser support pipe, the pedestal configured to engage a mounting surface.

20 Claims, 5 Drawing Sheets

(56) References Cited

U.S. PATENT DOCUMENTS

2019/0032823 A1 1/2019 McNamara et al.
2020/0158264 A1 5/2020 Ohnemus

OTHER PUBLICATIONS

Ohnemus, Gregory Nicholas Stagliano; Notice of Allowance for U.S. Appl. No. 16/194,164, filed Nov. 16, 2018, dated Nov. 24, 2020, 8 pgs.
Victaulic Company; Product Catalog for Victaulic® Floor-Mounted Carbon Steel Riser Anchor No. A10, publicly available prior to Aug. 2018, 4 pgs.
Victaulic Company; Product Catalog for Victaulic® Floor-Mounted Stainless Steel Riser Anchor No. A10S, publicly available prior to Aug. 2018, 4 pgs.

* cited by examiner

ADJUSTABLE RISER SUPPORT ASSEMBLY

CROSS-REFERENCE TO RELATED APPLICATIONS

The present application is a continuation of U.S. application Ser. No. 16/194,164, filed Nov. 16, 2018, which is hereby specifically incorporated by reference herein in its entirety

TECHNICAL FIELD

This disclosure relates to riser support assemblies. More specifically, this disclosure relates to a riser support assembly comprising adjustable mounts.

BACKGROUND

Piping systems, such as fire sprinkler systems, HVAC systems, and plumbing systems, are found in many structures (e.g., buildings.). In many instances, it is desirable to have a piping system rise from a lower level to an upper level of the structure. Vertical pipes, commonly called risers, can extend through one or more levels. Runs of such vertical piping are commonly called riser stacks.

Riser stacks can be supported by riser supports. A common example of a riser support is a riser clamp. Riser clamps can comprise a clamp for engaging a riser and one or more arms extending therefrom and configured to rest on an upper surface of a floor to transfer a portion of the load of the riser stack to the floor. Riser clamps can disengage from the floor upon expansion or compression of the piping system, which can occur when the piping system is pressurized with fluid after installation of the piping system, and are difficult to adjust once installed. Additionally, it can be difficult to set a desired gap between risers due to the weight of the riser stack, and expansion and contraction of the piping system can increase and decrease gaps.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a riser support assembly comprising a riser support pipe and a mount extending from a side of the riser support pipe, the mount configured to engage a mounting surface and to selectively adjust a height of the riser support assembly relative to the mounting surface.

Also disclosed is a riser system comprising a riser support pipe, a riser coupled to the riser support pipe, a floor comprising a mounting surface and a bore, the riser support pipe extending through the bore, and a mount extending from a side of the riser support pipe, the mount configured to engage the mounting surface and to selectively adjust a height of the riser support assembly relative to the mounting surface.

A method for adjusting a riser support assembly can comprise the steps of attaching a riser support pipe to a first riser, adjusting a length of a mount of the riser support pipe to adjust a height of the riser support pipe, and engaging a mounting surface with the mount.

Further, disclosed is a riser support pipe comprising a cylindrical sidewall defining a first end, an opposing second end, and an intermediate portion extending therebetween; and a mount defining an arm and a pedestal, the arm extending from the intermediate portion of the cylindrical sidewall, the pedestal extending from the arm distal to the riser support pipe, the pedestal configured to engage a mounting surface.

Also disclosed is a riser system comprising a riser support pipe comprising a cylindrical sidewall and a mount extending from the cylindrical sidewall, the cylindrical sidewall defining a first end and a second end opposite the first end, the mount configured to support the riser support pipe on a mounting surface; a first coupling attached to the first end of the riser support pipe; and a second coupling attached to the second end of the riser support pipe Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
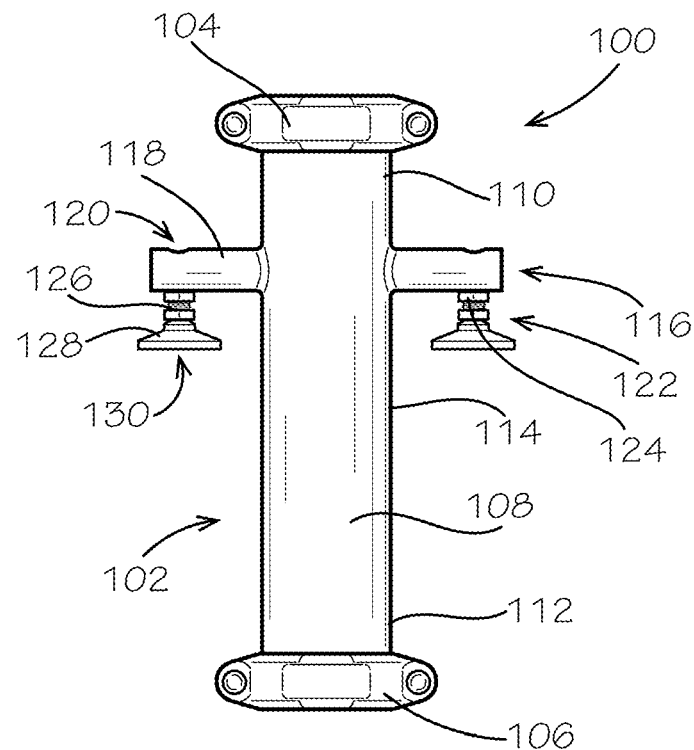
FIG. 1 is a front view of a riser support assembly comprising a support pipe, a pair of mounts, and a pair of pipe couplings, in accordance with the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The terms "riser" and "riser pipe" can generally refer to a vertically-oriented pipe. Piping systems installed in structures (e.g. buildings) often comprise runs of vertical piping extending through one or more floors. The floor(s) can define bores formed therein through which the risers can extend. Such vertical runs of piping can be referred to as a riser stack. It can be desired to reduce the load of a riser stack by supporting the riser stack on the surrounding structure, for example, on the floor(s) through which the riser stack can extend.

Disclosed in the present application is a riser support assembly and associated methods, systems, devices, and various apparatus. Example aspects of the riser support assembly can comprise a support pipe and a first pipe coupling for engaging a first riser of a piping system. The riser support assembly can further comprise a pair of adjustable mounts. As will be described in detail below, the riser support assembly can be configured to transfer a portion of the load of the piping system to a surrounding structure. It would be understood by one of skill in the art that the disclosed riser support assembly is described in but a few exemplary aspects among many. No particular terminology or description should be considered limiting on the disclosure or the scope of any claims issuing therefrom.

FIG. 1 illustrates a first aspect of riser support assembly 100 according to the present disclosure. The riser support assembly 100 can comprise a support pipe 102 (e.g., a riser nipple) and a first pipe coupling 104. In the present aspect, the riser support assembly can also comprise a second pipe coupling 106. The support pipe 102 can be formed as a hollow cylindrical tube comprising a cylindrical sidewall 108 defining a first end 110, an opposing second end 112, and an intermediate portion 114 extending therebetween. In some aspects, the support pipe can be a nipple, which can be described generally as a section of pipe less than ten (10) feet long. The first pipe coupling 104 can be coupled to the first end 110 of the support pipe 102, and the second pipe coupling 106 can be coupled to the second end 112 of the support pipe 102, such that the support pipe 102 extends between the first pipe coupling 104 and the second pipe coupling 106. Example aspects of the first and second pipe couplings 104, 106 can be substantially the same, and can be coupled to the support pipe 102 in substantially the same manner, as described below with reference to FIG. 6. In example aspects, the support pipe 102 of the pipe support assembly 100 can extend in a generally vertical direction, relative to the orientation shown. In some aspects, the support pipe 102 can be formed from extruded steel, for example and without limitation. Other example aspects of the support pipe 102 can be formed from another material or a combination of materials, including, but not limited to metal, plastic, resin, synthetic materials, and fibers.

The riser support assembly 100 can further comprise a pair of mounts 116a,b extending from the vertical support pipe 102. Each mount 116a,b can comprise an arm 118 and an adjustable pedestal 122. In example aspects, the arms 118 and the support pipe 102 can be separate components, and the arms 118 can be coupled to the support pipe 102 via a fastener, such as welds (not shown). In other aspects, the fastener can be, for example screws, bolts, clips, rivets, snaps, adhesives, or any other suitable fastener known in the art. In still other aspects, the arms 118 can be integrally formed with the support pipe 102. Other aspects of the riser support assembly 100 can define more or fewer mounts 116.

The arms 118 can be located on opposing sides of the cylindrical sidewall 108 of the support pipe 102, and in example aspects, can extend in a generally horizontal direction therefrom, relative to the orientation shown, such that the arms can be oriented approximately 180° relative to one another. In other aspects, the arms 118 can be oriented at another angle relative to one another, such as, for example, 90°. Further, other aspects can include more or fewer arms 118 as desired. As such, in the depicted aspect, the support pipe 102 and the arms 118 can extend generally perpendicular to one another. In some aspects, the arms 118 can be formed from the same material as the support pipe 102, such as, for example, extruded steel. Other example aspects of the arms 118 can be formed from another material or a combination of materials, including, but not limited to metal, plastic, resin, synthetic materials, and fibers.

Example aspects of the arms 118 can be formed as a cylinder defining a circular cross-section. Other aspects of the arms 118 can define another cross-sectional shape, such as, for example, oval, square, triangular, rectangular, etc. The arm 118 can be formed as a hollow cylindrical tube in some aspects, like the aspect disclosed in FIG. 1. In other aspects, the arm can be formed as a solid cylinder. In still other aspects of the mount 116, the arm 118 can be formed as a flange extending radially outward from the support pipe 102. In such an aspect, the arm 118 can extend fully or partially around a circumference of the support pipe 102. Further, example aspects of the arms 118 can define a length and a diameter that can be less than a length and a diameter of the support pipe 102. Each arm 118 can define a hole 120, each hole 120 extending through the arm 118 in a generally vertical direction, relative to the orientation shown. In some example aspects, such as the depicted aspect, the hole 120 can be a threaded hole. In other aspects, the hole 120 can be unthreaded. Furthermore, in some aspects, the hole 120 can be a through-hole, and in other aspects, the hole 120 can be a blind hole.

Each adjustable pedestal 122 can be coupled to a corresponding arm 118. The pedestal 122 can extend downwardly from the arm 118 in a generally vertical direction, such that the pedestal 122 and arm 118 extend perpendicular to one another, and such that the pedestal 122 and support pipe 102 extend parallel to one another, relative to the orientation shown. The pedestal 122 can comprise a foot 128 configured to engage a surrounding structure and a leg 126 extending between the arm 118 and the foot 128. In some aspects, the leg 126 can be a jackscrew, as shown. Some example aspects of the leg 126 can include a nut 124 (e.g. jam nut). The leg 126 can be formed as a cylindrical threaded bolt and can be configured to rotatably engage the threaded hole 120 on the corresponding arm 118. In other aspects, each leg 126 can engage a hole (not shown) located in the foot 128, such that the leg 126 can be repositionable with respect to the foot 128. Some example aspects of the pedestal 122 can comprise a handle (not shown) for turning the threaded leg 126 with respect to the arm 118.

The foot 128 of the mount 122 can be integrally formed with the leg 126 at a location distal to the arm 118. Other example aspects of the foot 128 can be coupled to the leg 126 by a fastener (not shown), such as, for example, by screws, bolts, clips, rivets, snaps, adhesives, welds, or any other suitable fastener known in the art. The foot 128 can comprise a base surface 130 for engaging a structure. According to example aspects, the base surface 130 can be substantially circular. However, in other aspects, the base surface 130 can define another shape, such as square, rectangle, triangle, etc. As shown, example aspects of the foot 128 can taper outwardly from the threaded leg 126, such the that the diameter of the base surface 130 of the foot 128 can be greater than the diameter of the threaded leg 126. Providing an increased diameter of the base surface 130 of the foot 128 can provide a more stable surface on which to support the riser support assembly 100. Moreover, the increased diameter of the base surface 130 can provide an increased surface area over which to distribute the load that is transferred from the riser stack to a support structure (e.g., a floor). In example aspects, as shown, the feet 128 can be spaced apart from the support pipe 102.

Figure 2:
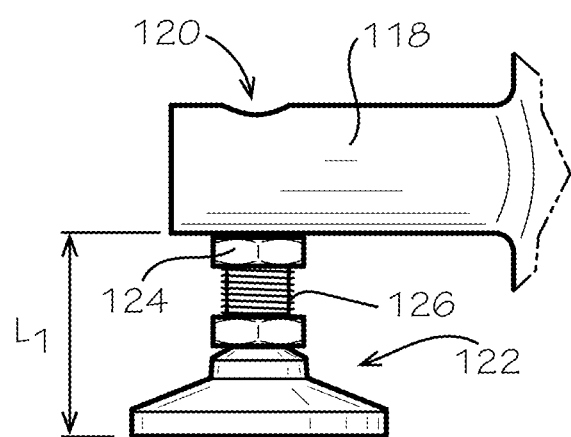
FIG. 2 is a front view of one of the mounts of FIG. 1 in an extended configuration.
Figure 3:
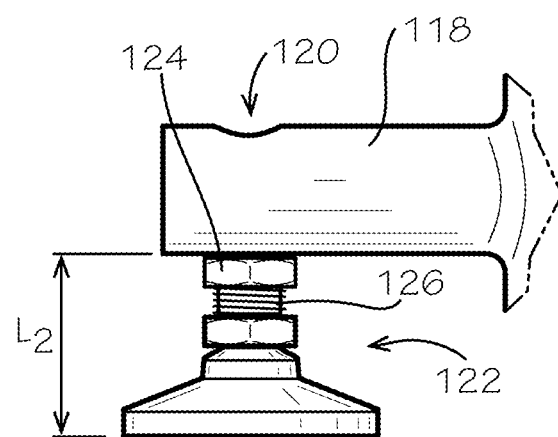
FIG. 3 is a front view of one of the mounts of FIG. 1 in a shortened configuration.

According to example aspects, the pedestal 122 can define an effective length that can be defined by the distance between the foot 128 and the arm 118. The effective length of the pedestal 122 can be selectively adjusted by turning the threaded leg 126 of the pedestal 122 with respect to the threaded hole 120 of the arm 118. The leg 126 can be turned counter-clockwise or clockwise to selectively thread the leg 126 further into the hole 120 or out of the hole 120, respectively, thus reducing or increasing the effective length of the pedestal 122, respectively. For example, FIG. 2 illustrates the leg 126 of the pedestal 122 in an extended configuration, wherein the leg 126 can be partially threaded with the hole 120 of the arm 118, such that the effective length of the pedestal 122 can be $L_1$. FIG. 3 illustrates the leg 126 in a shortened configuration, wherein the leg 126 can be threaded further into the hole 120 of the arm 118, such that the effective length of the pedestal 122 can be $L_2$. Example aspects of the leg 126 can be secured in in the desired position relative to the arm 118 by tightening the nut 124 against the arm 118. As shown, the effective length $L_1$ of the pedestal 122 in FIG. 2 can be greater than the effective length $L_2$ of the pedestal 122 in FIG. 3. Thus, as shown in FIG. 2, threading the leg 126 further out of the hole 120 increases the effective length L of the pedestal 122, and, as shown in FIG. 3, threading the leg 126 further into the hole 120 on the arm 118 reduces the effective length L of the pedestal 122. One of ordinary skill in the art will appreciate that, in other aspects, the adjustment of the leg 126 with respect to the arm 118 can be achieved by other common adjustment methods known in the art.

Figure 4:
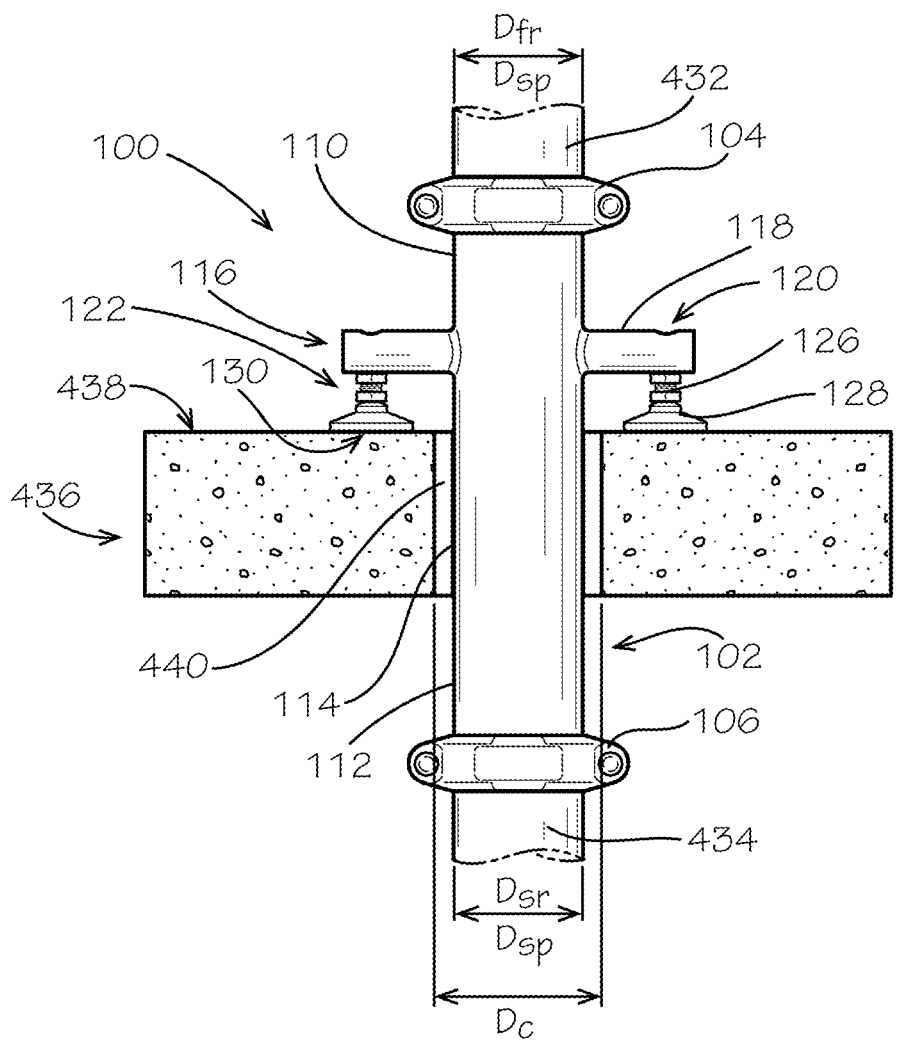
FIG. 4 is a front view the riser support assembly of FIG. 1 attached to first and second risers and in engagement with a floor.

FIG. 4 illustrates the riser support assembly 100 in engagement with first and second risers 432, 434 of a piping system. FIG. 4 also illustrates the base surface 130 of each foot 128 resting on an upper surface 438 of an elevated concrete floor 436 of a structure. The pair of mounts 116a,b can bear downwardly upon the concrete floor 436 to transfer a portion of the load of the piping system to the concrete floor 436. According to the depicted aspect, the base surface 130 of each foot 128 can define a substantially flat profile to match the substantially flat profile of the upper surface 438 of the concrete floor 436. The base surface 130 of the foot 128 can be attached to the upper surface 438 of the concrete floor 436 by a fastener (not shown)—for example screws, bolts, clips, rivets, snaps, adhesives, welds, or any other suitable fastener known in the art. In other aspects, the base surface 130 of each foot 128 can rest on the upper surface 438 of the concrete floor 436 without being attached to the concrete floor 436. Example aspects of the base surface 130 can further elements for increasing friction between the base surface 130 and the concrete floor 436, such as, for example, a rubber pad (not shown). Such friction-increasing elements can improve the grip between the base surface 130 of the foot 128 and the concrete floor 436, which can aid in prohibiting movement of the riser support assembly 100 with respect to the floor 436.

A bore 440 can be formed through the concrete floor 436 and can be sized and shaped to allow the support pipe 102 to extend therethrough. The base surfaces 130 of the feet 128 can be configured to rest on the concrete floor 436 surrounding the bore 440. As shown, the space formed between the feet 128 and the support pipe 102 can be great enough to accommodate for size of the bore 440, so that the feet 128 are spaced apart from the bore 440 when engaged with the concrete floor 436. The intermediate portion 114 of the support pipe 102 can be oriented within the bore 440, as depicted in FIG. 4. The first end 110 of the support pipe 102, the first coupling 104, and the pair of mounts 116a,b can be oriented above the concrete floor 436, and the second end 112 of the support pipe 102 and the second coupling 106 can be oriented below the concrete floor 436, relative to the orientation shown. The diameter $D_c$ of the bore 440 can be larger than the diameter $D_{sp}$ of the support pipe 102, so that the support pipe 102 can easily be installed within the bore 440. In example aspects, the difference between the diameter $D_c$ of the bore 440 and the diameter $D_{sp}$ of the support pipe 102 can be minimal to avoid large gaps between the support pipe 102 and the bore 440, which can be unsightly and dangerous.

The first and second couplings 104, 106 can couple the riser support assembly 100 to riser pipes 432, 434 of a piping system. For example, as shown in FIG. 4, the first coupling 104 can be coupled to the first end 110 of the support pipe 102 and can be configured to couple the support pipe 102 to a first riser 432 at a location that is above the concrete floor 436. The second coupling 106 can be coupled to the second end 112 of the support pipe 102 and can be configured to couple the support pipe 102 to a second riser 434 at a location that is below the concrete floor 436. The support pipe 102 can transfer liquids, gases, or other matter between the first and second risers 432, 434. The first riser 432 can define a diameter $D_{fr}$, and the second riser 434 can define a diameter $D_{sr}$. According to example aspects, such as the aspect depicted in FIG. 4, the diameter $D_{sp}$ of the support pipe 102 can substantially match the diameters $D_{fr}$, $D_{sr}$ of the first and second risers 432, 434, such that a flow of matter (e.g., liquids, gases, etc) between the first and second risers 432, 434 can be uninterrupted. In other aspects, the diameters of the first riser 432, second riser 434, and support pipe 102 can differ, as desired. Further, it should be noted that, while the support pipe 102 and first and second risers 432, 434 disclosed herein are oriented generally vertically, other example aspects of the support pipe 102, first riser 432, and/or second riser 434, can be non-vertical or can comprise non-vertical portions. The first and second risers 432, 434 can be formed from steel, such as for example, extruded steel. Other example aspects of the first and second risers 432, 434 can be formed from another material or a combination of materials, including, but not limited to metal, plastic, resin, synthetic materials, and fibers.

The riser support assembly 100 can be installed in the structure before a piping system is installed or can be fit with a piping system that is pre-installed in a structure. To install the riser support assembly 100 with a piping system, the second end 112 of the support pipe 102 can be inserted through the bore 440 in the concrete floor 436, and the intermediate portion 114 of the support pipe 102 can be positioned within the bore 440. The first coupling 104 can couple the first end 110 of the support pipe 102 to the first riser 432, and the second coupling 106 can couple the second end 112 of the support pipe 102 to the second riser 434. In other aspects, the second coupling 106 can be coupled to the second riser 434 before the first coupling 104 is coupled to the first riser 432. After the support pipe 104 is coupled to both the first riser 432 and the second riser 434, the mounts 116a,b can be selectively adjusted, as described above, such that the base surfaces 130 of the feet 128 rest on the upper surface 438 of the concrete floor 436 and bear down upon the concrete floor 436 with a desired force. As such, the adjustable mounts 116a,b of the riser support assembly 100 allow the riser support assembly 100 to accommodate for varying distances between the first riser 432 and the second riser 434. Such adjustability of the riser support assembly 100 can allow a desired gap to be set between the ends of the support pipe 102 and the first and second risers 432,434 before pressurization of the piping system, such that the first and second couplings 104,106 can properly engage the first and second risers 432, 434. Such adjustability can also allow a desired distance to be set between the first and second couplings 104,106 and the concrete floor 436 to protect the couplings 104,106 from contacting the floor 436 and to comply with industry standards.

The mounts 116a,b can also be adjusted after the piping system has been pressurized. It is common that piping systems can expand or contract during use, and it can be desirable to re-adjust the gaps between the support pipe 102 and first and second risers 432,434 to accommodate for such expansion or contraction of the piping system. In a first example, a piping system, such as a fire protection system, can be pressurized after installation. The pressurization of the piping system can cause expansion (e.g., lengthening) of the support pipe 102 of the riser support assembly 100 and/or the first and second risers 432, 434 of the piping system. Expansion of the first and second risers 432, 434 and/or support pipe 102 can cause the feet 128 of the riser support assembly 100 to be lifted up and out of contact with concrete floor 436, such that the piping system is no longer supported by the floor 436. In such an occurrence, the threaded leg 126 of the pedestal 122 can be partially unthreaded from the threaded hole 120 of the arm 118, increasing the effective length of the pedestal 122 and bringing the base surface 130 of the feet 128 back into contact with the concrete floor 436, thus allowing a portion of the load of the piping system to be transferred through the mounts 116a,b to the concrete floor 436. In a second example, a piping system can be used for transferring cold water. Cold water can cause the first and second risers 432, 434 and/or the support pipe 102 to contract, which can require an adjustment of the mounts 116a,b.

In still other aspects, the mounts 116 can be coupled (e.g., welded) to an existing riser pipe of an existing riser stack assembled in as structure, to allow for adjustability of the existing riser pipe.

Figure 5:
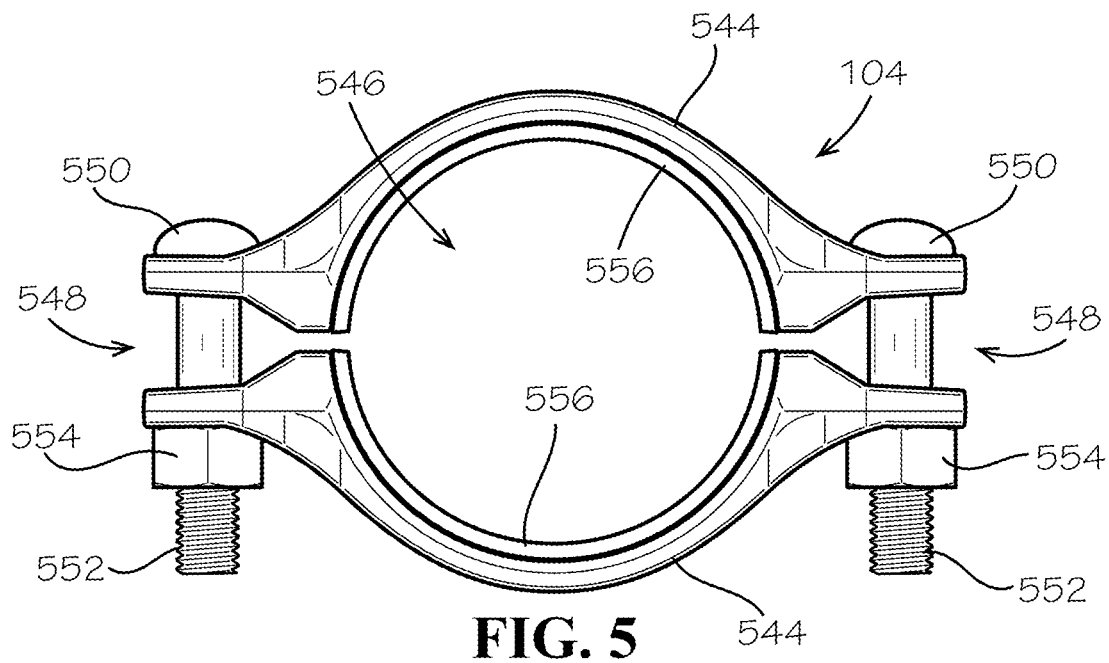
FIG. 5 is a front view of one of the pipe couplings of FIG. 1.

An example aspect of the first pipe coupling 104 is illustrated in FIG. 5. In example aspects, the second pipe coupling 106 (shown in FIG. 1) can be substantially the same as the first pipe coupling 104. The first pipe coupling 104 can be, for example, a flexible grooved pipe coupling, as shown. In other aspects, a rigid grooved pipe coupling or another suitable type of pipe coupling, such as a threaded coupling, can be used. The first pipe coupling 104 can comprise two semicircular coupling segments 544 that can be coupled together to define a cylindrical inner surface of the pipe coupling 104. A coupling void 546 can be defined by the inner surface of the pipe coupling 104. In some example aspects, the semicircular coupling segments 544 are formed from a metal material, such as steel or cast iron. Example aspects of cast iron can include ductile iron, gray iron, and malleable iron. In other example aspects, the semicircular coupling segments 544 can be formed from any material, or a combination of materials, that are known in the art, including but not limited to metal, plastic, resin, synthetic materials, and fibers. Further, in other aspects, the first pipe coupling 104 can comprise additional coupling segments. For example, the coupling segments can be in thirds or fourths, or any other number of coupling segments can be utilized.

Figure 6:
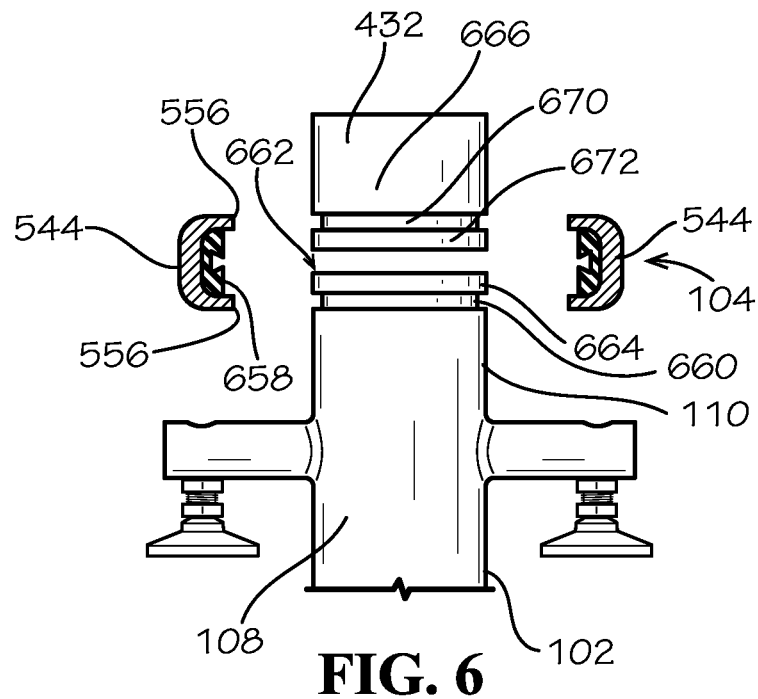
FIG. 6 is an exploded view of the support pipe and one of the pipe couplings of FIG. 1 and the first riser of FIG. 4.

As shown in FIG. 5, the semicircular coupling segments 544 can be coupled together by fasteners 548. While two fasteners 548 are shown, each at an opposing end of the semicircular coupling segments 544, any number of fasteners 548 can be used. The fasteners 548 can be, for example, track bolts, as shown in the figures. Example aspects of the fasteners 548 can be generally mushroom-shaped, defining a dome-shaped head end 550 and a cylindrical threaded tail end 552 extending therefrom. Each fastener 548 can be secured to the semicircular coupling segments 544, and thus the semicircular coupling segments 544 can thus be secured to one another, by coupling a mating threaded nut 554 to the threaded tail end 552 of the fastener 548 and tightening the nut 554 against the adjacent semicircular coupling segment 544. The fastener 548 and nut 554 can be formed from any suitable material, including, but not limited to, metal and plastic. Further, in other aspects, the fasteners 548 can be clips, rivets, snaps, adhesive, welds, or any other fastener known in the art. When coupled together, the semicircular coupling segments 544 can define a pair of annular ridges 556, one of which is shown in FIG. 5. Each one of the annular ridges 556 can extend along an opposing side of the first pipe coupling 104 and can project inwardly towards the void 546. Both annular ridges 556 are shown in FIG. 6. In some aspects, the first and second pipe coupling 104, 106 can be substantially similar to the coupling shown and described in U.S. Pat. No. 9,194,516, which is incorporated herein by reference in its entirety.

FIG. 6 illustrates an exploded view of the first pipe coupling 104, the first end 110 of the support pipe 102, and the first riser 432. Note, the first pipe coupling 104 is shown in cross-section in FIG. 6. The first pipe coupling 104 can be configured to receive corresponding portions of the support pipe 102 and the first riser 432. The first end 110 of the support pipe 102 can comprise a circular groove 660 formed in the sidewall 108 and spaced apart from a peripheral edge 662 of the sidewall 108. A flange ring 664 can be defined between the peripheral edge 662 of the support pipe 102 and the circular groove 660. Example aspects of the flange ring 664 can comprise a diameter substantially equal to the diameter of the support pipe 102. A first end 666 of the first riser 432 can also define a circular groove 670 and a flange ring 672, similar to the first end 110 of the support pipe 102. Example aspects of the flange ring 672 of the first riser 432 can comprise a diameter substantially equal to the diameter of the first riser 432. Further, as noted above, according to example aspects, the diameter of the support pipe 102 can be substantially equal to the diameter of the first riser 432.

A gasket 658 can be positioned on the inner surface of the pipe coupling 104 between the opposing annular ridges 556. The gasket 658 can be formed from a rubber material, or any other suitable material known in art, including, but not limited to, silicone, cork, and neoprene. The pipe coupling 104 can be secured to the first riser 432 and the support pipe 102 by clamping the semicircular coupling segments 544 together around the first end 110 of the support pipe 102 and the first end 666 of the first riser 432. The flange ring 644 of the support pipe 102 and the flange ring 672 of the first riser 432 can be positioned within the coupling channel 646 and can be configured to engage the gasket 658. One of the pair of annular ridges 556 of the pipe coupling 104 can engage the circular groove 660 on the support pipe 102, and the other of the annular ridges 556 of the pipe coupling 104 can engage the circular groove 670 on the first riser 432. The engagement of the annular ridges 556 with the circular groove 660 of the support pipe 102 and the circular groove 670 of the first riser 432 retains the support pipe 102 and the first riser 432 in engagement with the pipe coupling 104. The gasket 658 can improve the grip of the pipe coupling 104 on the support pipe 102 and the first riser 432 for a more secure engagement between the components. The gasket 658 can also create a seal that can aid in preventing leakage of matter transferred between the first riser 432 and support pipe 102. While the example support pipe 102, first riser 432, and pipe coupling 104 illustrated herein define a substantially circular cross-section, it will be appreciated by one skilled in the art that, in other aspects, these components can be formed with another cross-sectional shape, as desired, including, for example, oval, square, rectangular, triangular, trapezoidal, pentagonal, etc. As noted above, the second coupling 106 (shown in FIG. 1) can be coupled to the second riser 434 (shown in FIG. 4) in substantially the same manner.

Figure 7:
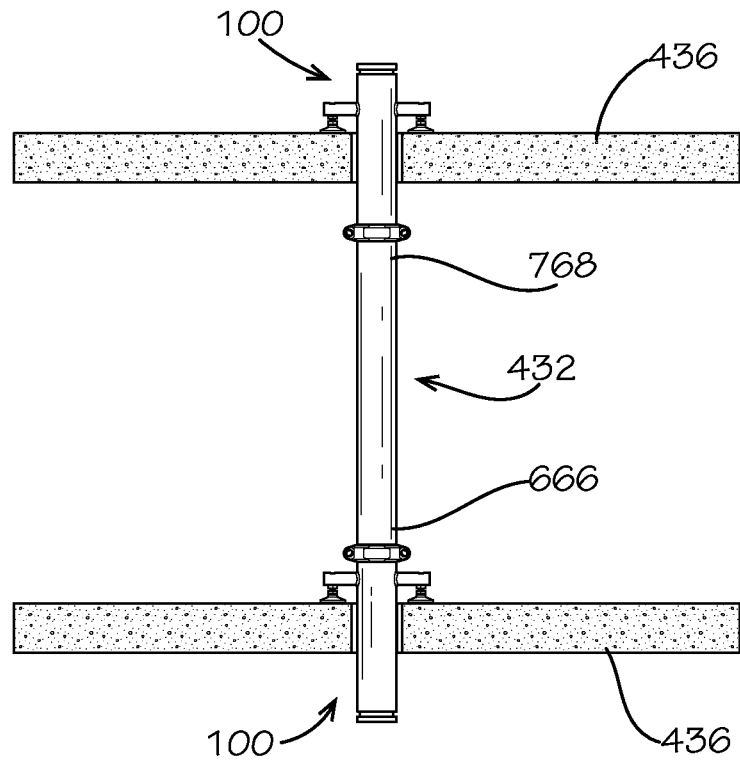
FIG. 7 is a front view of a pair of the riser support assemblies of FIG. 1 in engagement with first and second floors and a riser, in accordance with another example aspect of the present disclosure.

Example aspects of a riser stack can be supported by a single riser support assembly 100 or can be supported by multiple riser support assemblies 100. For example, FIG. 7 illustrates a pair of riser support assemblies 100 fitted with a piping system that extends through a pair of concrete floors 436. A first one of the riser support assemblies 100 engages a first one of the concrete floors 436 and a second one of the riser support assemblies 100 engages a second one of the concrete floors 436. According to example embodiments, the second one of the concrete floors 436 can be positioned above the first one of the concrete floors 436. The first end 666 of the first riser 432 can be coupled to the first riser support assembly 100, and a second end 768 of the first riser 432 can be coupled to the second riser support assembly 100. Other example aspects can comprise additional risers 432 and/or riser support assemblies 100.

Figure 8:
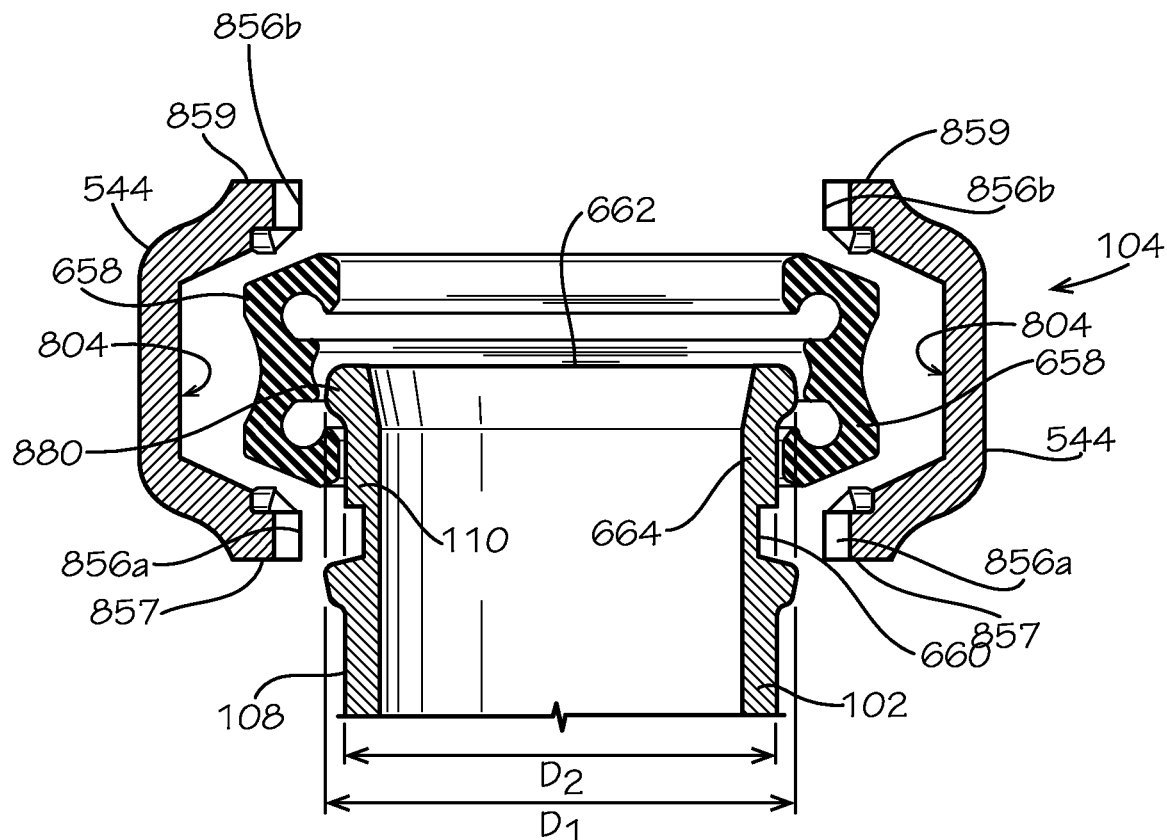
FIG. 8 illustrates an exploded cross-sectional view of another aspect of the pipe coupling, another aspect of a support pipe, and the first riser of FIG. 4, in accordance with the present disclosure.
Figure 9:
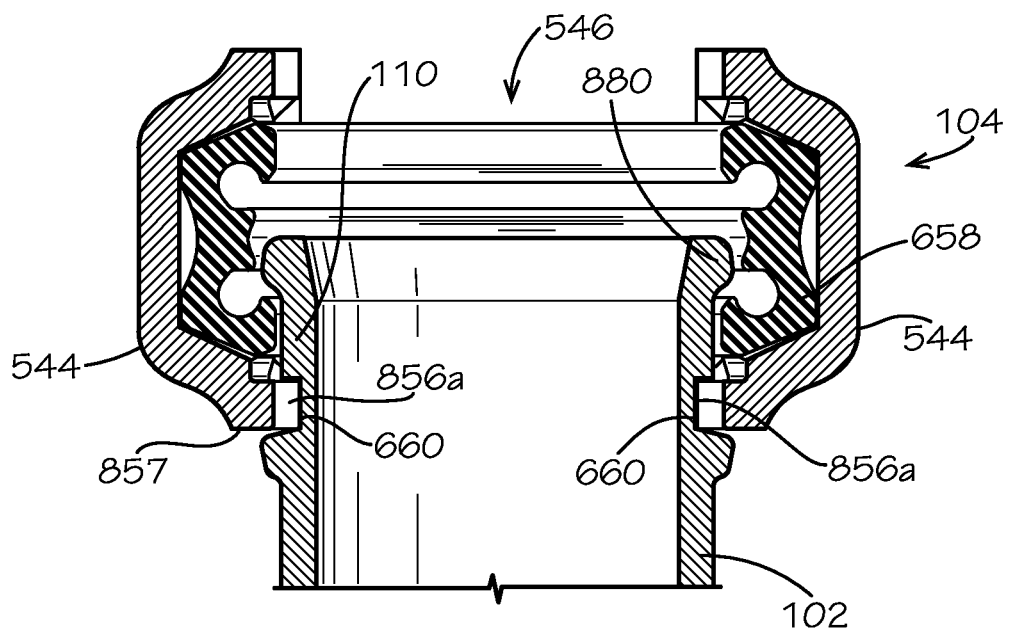
FIG. 9 is a cross-sectional view of the pipe coupling of FIG. 8 assembled with the support pipe of FIG. 8 in a relaxed configuration.
Figure 10:
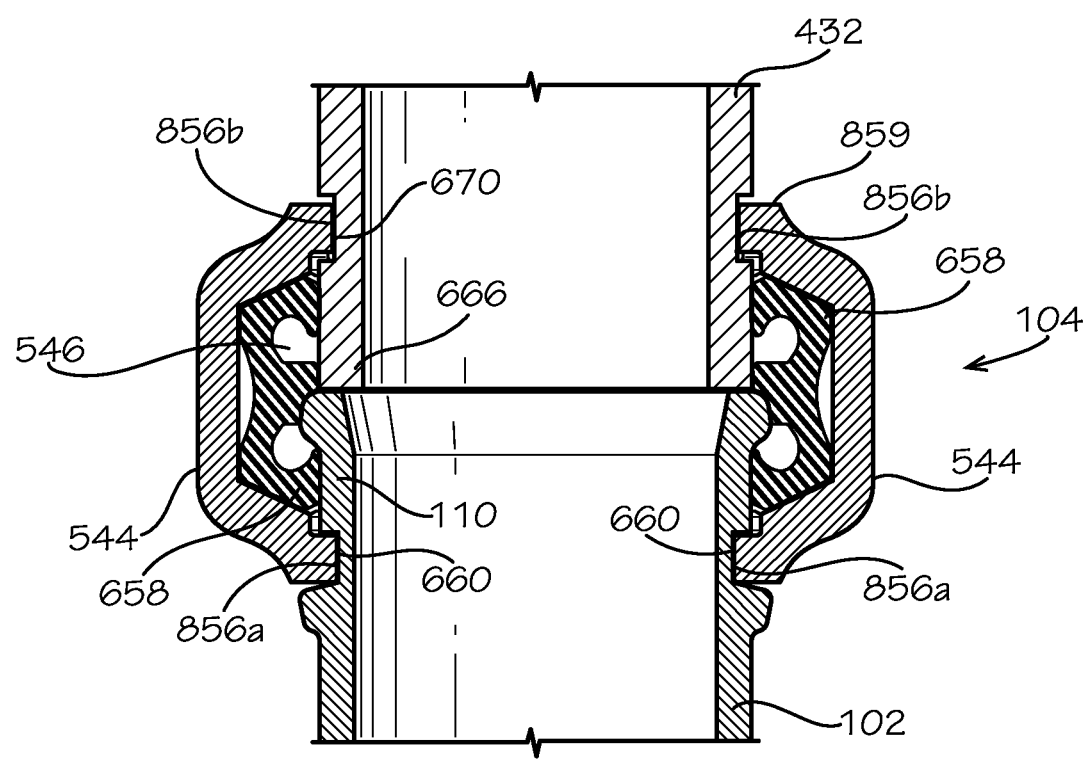
FIG. 10 is a cross-sectional view of the pipe coupling of FIG. 8 assembled with the support pipe of FIG. 8 and the first riser of FIG. 4 in a tensioned configuration.

FIGS. 8-10 illustrate a cross-sectional view of another aspect of the first pipe coupling 104. In example aspects, the first pipe coupling 104 and second pipe coupling 106 (shown in FIG. 1) can be substantially the same. The first pipe coupling 104 can be configured to engage the first end 110 of the support pipe 102 and the first end 666 (shown in FIG. 6) of the first riser 432 (shown in FIG. 4). Referring to FIG. 8, the first end 110 of the support pipe 102 can define the circular groove 660 formed in the sidewall 108 of the support pipe 102. The circular groove 660 can be spaced from the peripheral edge 662 of the sidewall 108, as shown. The flange ring 664 can be defined between the peripheral edge 662 of the support pipe 102 and the circular groove 660. Furthermore, in the present aspect, an annular lip 880 can be defined on the flange ring 664 adjacent the peripheral edge 662 of the support pipe 102. According to example aspects, a diameter $D_1$ of the annular lip 880 can be greater than a diameter $D_2$ of the flange ring 664, as shown.

The first pipe coupling 104 of the current aspect, as well as the end configuration of the first end 110 of the support pipe 102 with the annular lip 880, can be substantially similar to the pipe coupling and various end configurations shown and described in U.S. application Ser. No. 16/044,080, which is incorporated herein by reference in its entirety. The first pipe coupling 104 can comprise the two generally semicircular coupling segments 544 that can be coupled together to define an inner surface 804 of the pipe coupling 104. In other aspects, the first pipe coupling 104 can comprise additional coupling segments 544. For example, the coupling segments 544 can be in thirds or fourths, or any other number of coupling segments 544, including a single coupling segment 544 completely or nearly completely encircling the first end 110 of the support pipe 102, can be utilized. Each of the semi-circular coupling segments 544 can define a first semi-circular ridge 856a at a first axial end 857 of the semi-circular coupling segment 544 and a second semi-circular ridge 856b at a second axial end 859 of the semi-circular coupling segment 544. Each one of the semi-circular ridges 856a,856b can project radially inward, as shown. The first pipe coupling 104 can further comprise the gasket 658. Example aspects of the gasket 658 can be formed from a rubber material, or any other suitable material known in art, including, but not limited to, silicone, cork, and neoprene.

In example aspects, the first coupling 104 can be pre-assembled with the support pipe 102 by a manufacturer or an installer. For example, as shown in FIG. 8, the gasket 658 can be forced over the annular lip 880 of the support pipe 102, and the annular lip 880 can engage the gasket 658 to prohibit disengagement of the support pipe 102 from the gasket 658. Then, as shown in FIG. 9, each of the coupling segments 544 can be assembled around the gasket 658. The coupling segments 544 can be loosely secured together by a fastener(s) (not shown) to form the assembled pipe coupling 104 in a relaxed configuration. In example aspects, the fasteners can be similar to the track bolt fasteners 548 (shown in FIG. 5), and in other aspects, the fasteners can be clips, rivets, snaps, adhesive, welds, or any other fastener known in the art. The interference between the gasket 658 and the annular lip 880 can prevent the support pipe 102 from disengaging the pipe coupling 104, even in the relaxed configuration. In some aspect, in the relaxed configuration, each of the first semicircular ridges 856a of the coupling segments 544 can engage the circular groove 660 of the support pipe 102 to further aid in prohibiting disengagement of the support pipe 102 from the pipe coupling 104.

As shown in FIG. 10, the first end 666 of the first riser 432 can then be oriented in a facing relationship with the first end 110 of the support pipe 102 and can be inserted into the void 546 at the second axial end 859 of the coupling segments 544. The second semicircular ridges 856b of the coupling segments 544 can be aligned with the circular groove 670 of the first riser 432. The fastener(s) (not shown) can then be tightened to engage the first semicircular ridges 856a with the circular groove 660 to engage the second semicircular ridges 856b with the circular groove 670 to secure the pipe coupling 104 to the first riser 432 and to orient the pipe coupling 104 in a tensioned configuration.

In summary, in accordance with an example aspect of the disclosure, the riser support assembly 100 can be configured to transfer a portion of the load of a piping system to a surrounding structure, such as a floor. The riser support assembly 100 can comprise one or more mounts 116a,b for engaging the surrounding structure, and the mounts 116a,b can be configured to be selectively adjusted during installation to accommodate for varying distances between risers of the piping system. The adjustable mounts 116a,b can also be configured to be selectively adjusted after installation to accommodate for the expansion and/or compression of the piping system and/or the riser support assembly 100.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A riser support assembly comprising:
   a riser support pipe comprising a cylindrical sidewall defining a first end, an opposing second end, and an intermediate portion extending therebetween; and
   a mount defining an arm and a pedestal, the arm extending from the intermediate portion of the cylindrical sidewall, the pedestal extending from the arm distal to the riser support pipe, the pedestal configured to engage a mounting surface.

2. The riser support assembly of claim 1, wherein the pedestal is oriented substantially parallel to the riser support pipe.

3. The riser support assembly of claim 1, wherein the pedestal comprises a leg and a foot, the leg extending from the arm, the foot oriented distal to the arm, the foot defining a base surface configured to engage the mounting surface.

4. The riser support assembly of claim 3, wherein a width of the base surface of the foot is greater than a width of the leg.

5. The riser support assembly of claim 3, wherein the arm defines a hole, and the leg of the pedestal engages the hole to couple the pedestal to the arm.

6. The riser support assembly of claim 5, wherein the hole is a threaded hole and the leg defines external threading configured to rotationally engage the threaded hole.

7. The riser support assembly of claim 6, further comprising a nut rotationally mounted on the leg.

8. The riser support assembly of claim 1, wherein the arm is welded to an exterior surface of cylindrical sidewall.

9. The riser support assembly of claim 1, wherein the mount is adjustable between a first orientation and a second orientation to selectively adjust a height of the riser support assembly relative to the mounting surface.

10. The riser support assembly of claim 9, wherein:
in the first orientation, the pedestal defines a first effective length and is extended relative to the arm; and
in the second orientation, the pedestal defines a second effective length and is shortened relative to the arm.

11. The riser support assembly of claim 1, wherein the mount is a first mount, the first mount extending from a first side of the riser support pipe, the riser support assembly further comprising a second mount extending from a second side of the riser support pipe opposite the first side.

12. The riser support assembly of claim 1, further comprising a first coupling attached to the first end of the riser support pipe, wherein the first coupling is configured to engage a riser of a piping system.

13. The riser support assembly of claim 12, wherein the first coupling comprises:
a first coupling segment;
a second coupling segment; and
a gasket, wherein the gasket is configured to be pushed over the first end of the riser support pipe, and wherein the first and second coupling segment are configured to be assembled around the gasket and secured together to prohibit the riser support pipe from disengaging the first coupling.

14. A riser system comprising:
a riser support pipe comprising a cylindrical sidewall and a mount extending from the cylindrical sidewall, the cylindrical sidewall defining a first end and a second end opposite the first end, the mount configured to support the riser support pipe on a mounting surface;
a first coupling attached to the first end of the riser support pipe; and
a second coupling attached to the second end of the riser support pipe.

15. The riser system of claim 14, further comprising a floor defining a bore and the mounting surface, the cylindrical sidewall extending through the bore.

16. The riser system of claim 14, wherein the mount defines an arm extending from the cylindrical sidewall and a pedestal extending from the arm distal to the riser support pipe, wherein the pedestal is oriented substantially parallel to cylindrical sidewall.

17. The riser system of claim 16, wherein;
the pedestal comprises a leg extending from the arm and a foot oriented distal to the arm;
the foot defines a base surface configured to engage the mounting surface; and
a width of the base surface of the foot is greater than a width of the leg.

18. The riser system of claim 14, wherein the mount is adjustable between a first orientation and a second orientation to selectively adjust a height of the riser support pipe relative to the mounting surface.

19. The riser system of claim 18, wherein:
the mount defines an arm extending from the cylindrical sidewall and a pedestal extending from the arm distal to the cylindrical sidewall;
in the first orientation, the pedestal defines a first effective length and is extended relative to the arm; and
in the second orientation, the pedestal defines a second effective length and is shortened relative to the arm.

20. The riser system of claim 14, wherein each of the first coupling and second coupling comprises a first coupling segment, a second coupling segment, and a gasket received therebetween.

* * * * *